US009775459B2

(12) United States Patent
Wurdinger et al.

(10) Patent No.: US 9,775,459 B2
(45) Date of Patent: Oct. 3, 2017

(54) COOKING DEVICE

(75) Inventors: Guenter Wurdinger, Peissenberg (DE); Hannes Laessig, Munich (DE); Lutz Riefenstein, Weilheim i. OB (DE)

(73) Assignee: Convotherm Elektrogeraete GmbH, Eglfing (DE)

( * ) Notice: Subject to any disclaimer, the term of this patent is extended or adjusted under 35 U.S.C. 154(b) by 420 days.

(21) Appl. No.: 14/232,098

(22) PCT Filed: Jul. 25, 2011

(86) PCT No.: PCT/EP2011/003720
§ 371 (c)(1),
(2), (4) Date: May 19, 2014

(87) PCT Pub. No.: WO2013/013684
PCT Pub. Date: Jan. 31, 2013

(65) Prior Publication Data
US 2014/0290500 A1    Oct. 2, 2014

(51) Int. Cl.
*A47J 27/04* (2006.01)
*F24C 15/20* (2006.01)
*F24C 14/00* (2006.01)

(52) U.S. Cl.
CPC ............. *A47J 27/04* (2013.01); *F24C 14/005* (2013.01); *F24C 15/2007* (2013.01); *A47J 2027/043* (2013.01)

(58) Field of Classification Search
CPC . A47J 27/04; A47J 2027/043; F24C 15/2007; F24C 14/005
USPC ........ 99/476, 474, 475, 473, 467; 126/21 A; 219/400, 401, 681, 682
See application file for complete search history.

(56) References Cited

U.S. PATENT DOCUMENTS

| 5,235,903 A | * | 8/1993 | Tippmann | ................. A21B 3/04 |
| | | | | 126/20 |
| 5,499,577 A | * | 3/1996 | Tommasini | ........... F24C 15/327 |
| | | | | 126/21 A |
| 5,503,061 A | * | 4/1996 | Hopkins | ................. A47J 37/04 |
| | | | | 221/150 A |

(Continued)

FOREIGN PATENT DOCUMENTS

| DE | 10110112 C2 | 5/2002 | |
| DE | 10160152 A1 | * 6/2003 | ............ F24C 15/327 |

(Continued)

OTHER PUBLICATIONS

Chinese Office Action dated May 27, 2015 for Chinese application No. 201180072565.5.

(Continued)

*Primary Examiner* — David Angwin
*Assistant Examiner* — Biniam Asmelash
(74) *Attorney, Agent, or Firm* — Ohlnadt, Greeley, Ruggiero & Perle, L.L.P.

(57) ABSTRACT

A cooking device comprising a first interior chamber, a second interior chamber being fluidly connected with the first interior chamber via a drain and comprising a first water reservoir, the drain and the first water reservoir forming a first air trap, and a device outlet downstream of the second interior chamber, whereby said air trap is adapted to be opened or closed by lowering or lifting the first water reservoir between the first interior chamber and the second interior chamber.

15 Claims, 5 Drawing Sheets

(56) References Cited

U.S. PATENT DOCUMENTS

| | | | | |
|---|---|---|---|---|
| 5,690,020 | A * | 11/1997 | Kitani | C12G 3/00 99/276 |
| 5,694,835 | A * | 12/1997 | Mangina | A21B 3/04 126/21 A |
| 7,325,481 | B2 * | 2/2008 | Helm | F24C 15/327 99/330 |
| 7,634,992 | B2 * | 12/2009 | Bujeau | A21B 3/04 126/19 R |
| 7,677,163 | B2 * | 3/2010 | Helm | F24C 14/005 99/330 |
| 2002/0117162 | A1 * | 8/2002 | Bassoli | A47J 36/38 126/21 A |
| 2002/0179588 | A1 * | 12/2002 | Lubrina | A21B 3/04 219/400 |
| 2006/0249136 | A1 * | 11/2006 | Reay | F24C 15/327 126/20 |
| 2006/0260476 | A1 * | 11/2006 | Helm | F24C 14/005 99/476 |
| 2009/0252855 | A1 * | 10/2009 | Ewald | A47J 29/02 426/614 |
| 2010/0151092 | A1 * | 6/2010 | Sus | A23L 1/0121 426/231 |
| 2014/0311360 | A1 * | 10/2014 | Bartelick | F24C 3/124 99/468 |
| 2014/0319119 | A1 * | 10/2014 | Raghavan | H05B 1/0263 219/396 |

FOREIGN PATENT DOCUMENTS

| | | | | |
|---|---|---|---|---|
| DE | 102009009013 A1 * | 8/2010 | | F24C 15/327 |
| EP | 1717518 A1 | 11/2006 | | |

OTHER PUBLICATIONS

International Search Report dated May 21, 2012 for PCT/EP2011/003720.

* cited by examiner

COOKING DEVICE

BACKGROUND

1. Field of the Disclosure

The disclosure relates to a cooking device.

2. Discussion of the Background Art

Such a cooking device is known from DE 10110 112 C1.

Another cooking device is known from DE 102009 009 013 A1 describing the provision of an air trap between a first interior chamber in the form of a cooking chamber and a drain of the cooking device.

Moreover, another cooking device is known from EP 1 717 518 B 1 comprising an air trap which is arranged downstream of a cooking chamber outlet. The device outlet is arranged downstream of the air trap and a water reservoir that is connected to the cooking chamber is provided in the air trap.

It is an object underlying the present disclosure to provide a cooking device that is easy to handle and makes it possible to simplify the overall construction for the purpose of a dehumidification and an easy cleaning of the cooking chamber.

SUMMARY

In detail, for the purpose of a dehumidification of the first interior chamber, a throttle valve can be opened and the water level of a first water reservoir can be lowered. Due to a resulting suction effect adjacent to a fan of the first chamber dry air will be sucked into said first chamber from the environment. A vapour air mixture is supplied out of the first chamber through a drain, at least the second chamber and into an air vent.

For the purpose of cleaning the first interior chamber it is preferable to provide a dosing pump, a dip tube, a filling tube as well as a nozzle. A liquid cleansing agent can automatically be supplied to the second water reservoir by means of the dosing pump. Alternatively, the cleansing agent (dry or liquid) can manually be fed to the second water reservoir by filling it into a filling tube.

A nozzle can be disposed on the top of the first interior chamber and can be used for a pre-cleansing step spraying clear water into the first interior chamber. Moreover, the positioning of a temperature sensor in a third water reservoir of a third interior chamber saves cooling water as said cooling water is only fed into said third interior chamber if the third water reservoir adjacent to the drain is too hot. Further advantages, features and details of the present disclosure can be learned from the accompanying figures showing:

DETAILED DESCRIPTION OF THE PREFERRED EMBODIMENT

Figure 1:
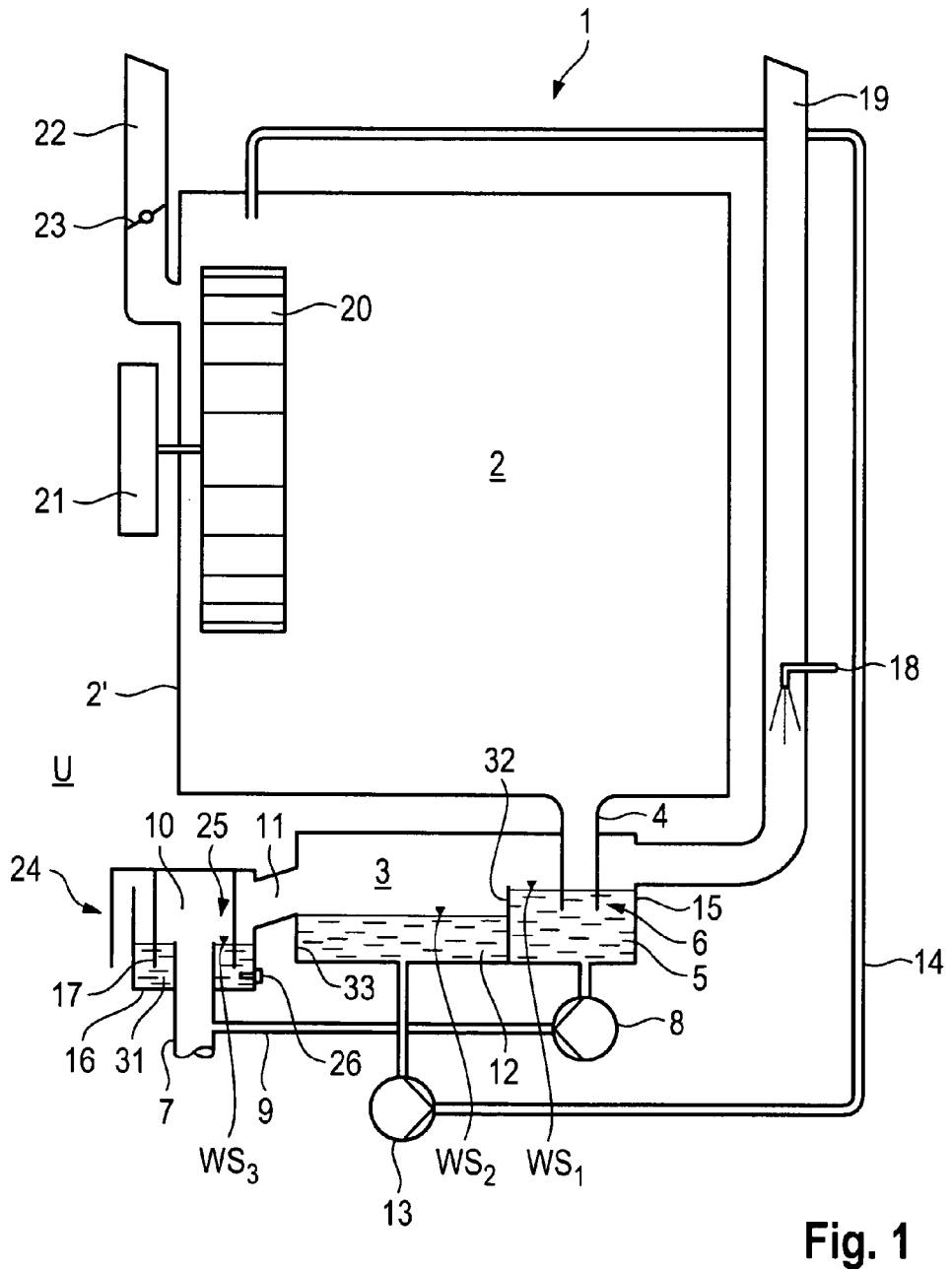
FIG. 1 a schematically simplified depiction of a first embodiment of the cooking device according to present disclosure.

FIG. 1 shows a first embodiment of a cooking device 1 having a first interior chamber 2 being located in a housing 2'. In this case the first interior chamber 2 constitutes a cooking chamber.

At the bottom of the housing 2' there is a drain 4 of the first chamber 2 that leads into a second chamber 3 being located in a container 15. The chamber 3 includes a first water level $WS_1$ and a second water level $WS_2$ that is lower than the first water level $WS_1$. Consequently, a wall 32 determining the first water level $WS_1$ and disposed in said container 15 is higher than a wall 33 determining the second water level $WS_2$.

Thus, the container 15 includes a first water reservoir 5 and a second water reservoir 12. The first water reservoir 5 and the drain 4 constitute an air trap 6 that can be opened or closed by lowering or lifting the first water reservoir 5 and its first water level $WS_1$, respectively. For this purpose, a drain pump is connected with the first water reservoir 5 and, via a conduit 9, with a drain (device outlet) 7 of the cooking device 1 so that, for lowering the first water level $WS_1$, the drain pump 8 supplies water out of the water reservoir 5 to the drain 7.

The second interior chamber 3 is connected to a third interior chamber 10 via a connecting conduit 11. The third interior chamber 10 is located in a container 16 that can be made from plastics in order to lower the production costs of the cooking device 1. The first container 15 of the second interior chamber 3 is preferably made from sheet metal in order to withstand the influence from e.g. chemicals that can be introduced into the second interior chamber 3 for the purpose of cleaning the first interior chamber 2.

For this purpose the second water reservoir 12 is connected to a recirculating pump 13 for feeding cleansing water to chamber 2. The recirculating pump 13 is located in a recirculating line 14 via which the cleansing water can be fed to the first interior chamber 2.

The third container 16 of the third interior chamber 10 includes a water reservoir 31 with an associated third water level $WS_3$. This water reservoir 31 constitutes an air trap 25 adjacent to connecting conduit 11 as well as an air trap 17 adjacent to an emergency overflow 24 as can be seen in detail from FIG. 1.

These two air traps 17 and 25 are always closed.

Moreover, as can be seen from FIG. 1, the container 16 is equipped with a temperature sensor 26. The positioning of this temperature sensor 26 in the third water reservoir 31 of the third interior chamber 10 saves cooling water as said cooling water is only fed into said third interior chamber 10 if the third water reservoir 31 adjacent to the drain 7 is too hot. This is an improvement over known dispositions of such temperature sensors in the second interior chamber 3 that may be influenced by hot water steams coming from the first interior chamber 2 resulting in a false determination of the influencing water temperature for determining a sufficient water supply of cool water through a fresh water inlet 18 disposed in an air vent 19 being connected to the second interior chamber 3.

Moreover, the cooking device 1 according to the present disclosure comprises a fan 20 driven by a motor 21. Housing 2' moreover includes a fresh air inlet 22 comprising a dehumidification valve 23.

For the purpose of a dehumidification of the first interior chamber 2 the dehumidification valve (throttle valve) 23 can be opened and the water level of WS1 of the first water reservoir 5 can be lowered. Due to a resulting suction effect adjacent to fan 20 dry air will be sucked into the first chamber 2 from the environment U and a vapour air mixture will be supplied out of the first chamber 2 through the drain 4 into the second chamber 3 and, thereafter, into the air vent 19. For the purpose of cleaning the first interior chamber 2 a liquid or solid cleansing agent can be supplied to the second water reservoir 12 of the second interior chamber 3, and can be circulated by means of the circulating pump 13 and the circulating line 14 leading into the first chamber 2.

Figure 2:
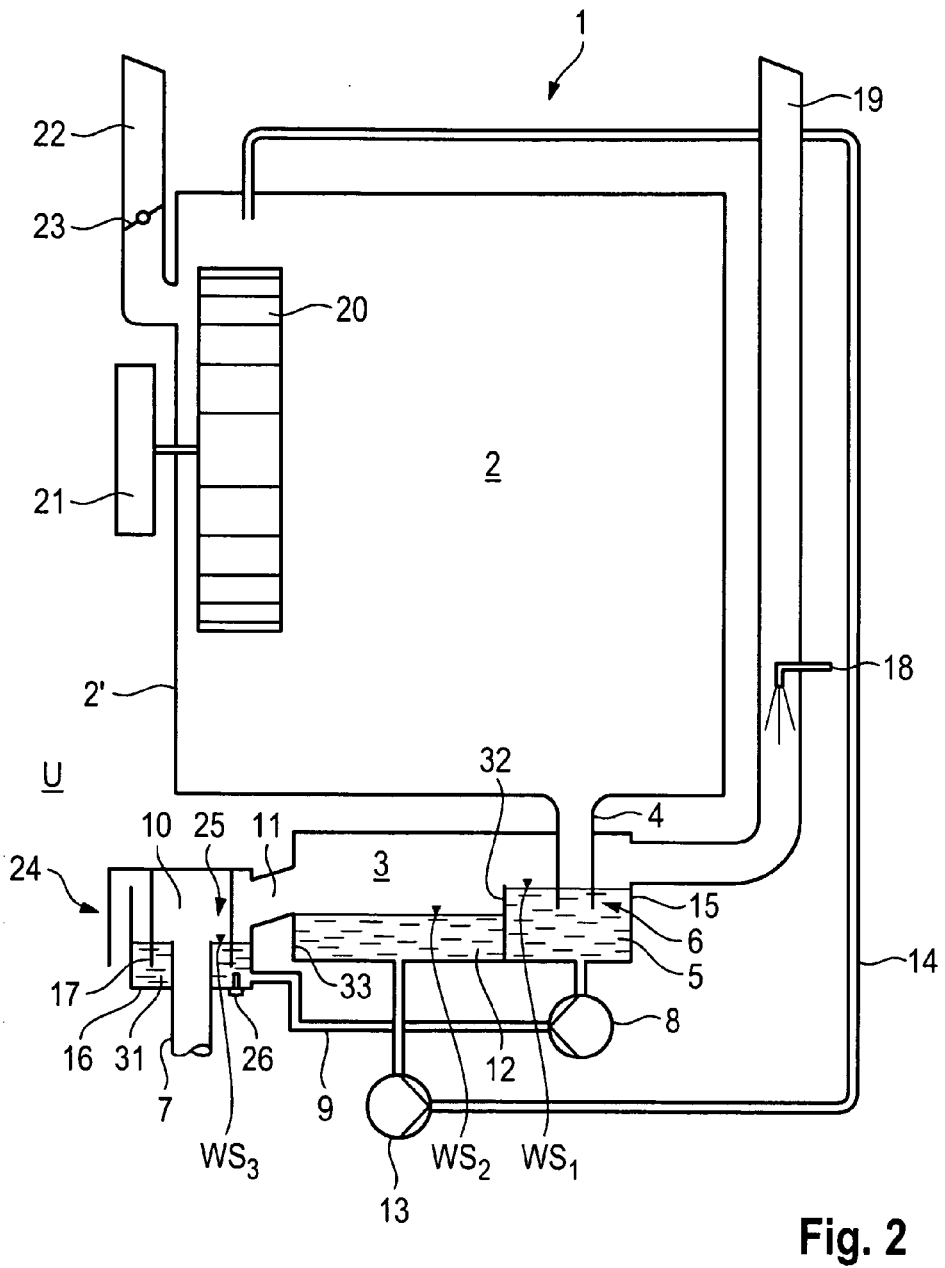
FIG. 2 a depiction corresponding to the simplified depiction of FIG. 1 showing a second embodiment.

FIG. 2 shows a second embodiment of the cooking device 1 that differs from the first embodiment according to FIG. 1 only in that conduit 9 leads to container 16 rather than to drain 7 as with the first embodiment.

So, for the remaining components and function of the cooking device 1 of the embodiment of FIG. 2, reference can be made to the foregoing description of FIG. 1. Consequently, all components and features of the embodiment of FIG. 2 are identified by the same reference numerals as in FIG. 1.

Figure 3:
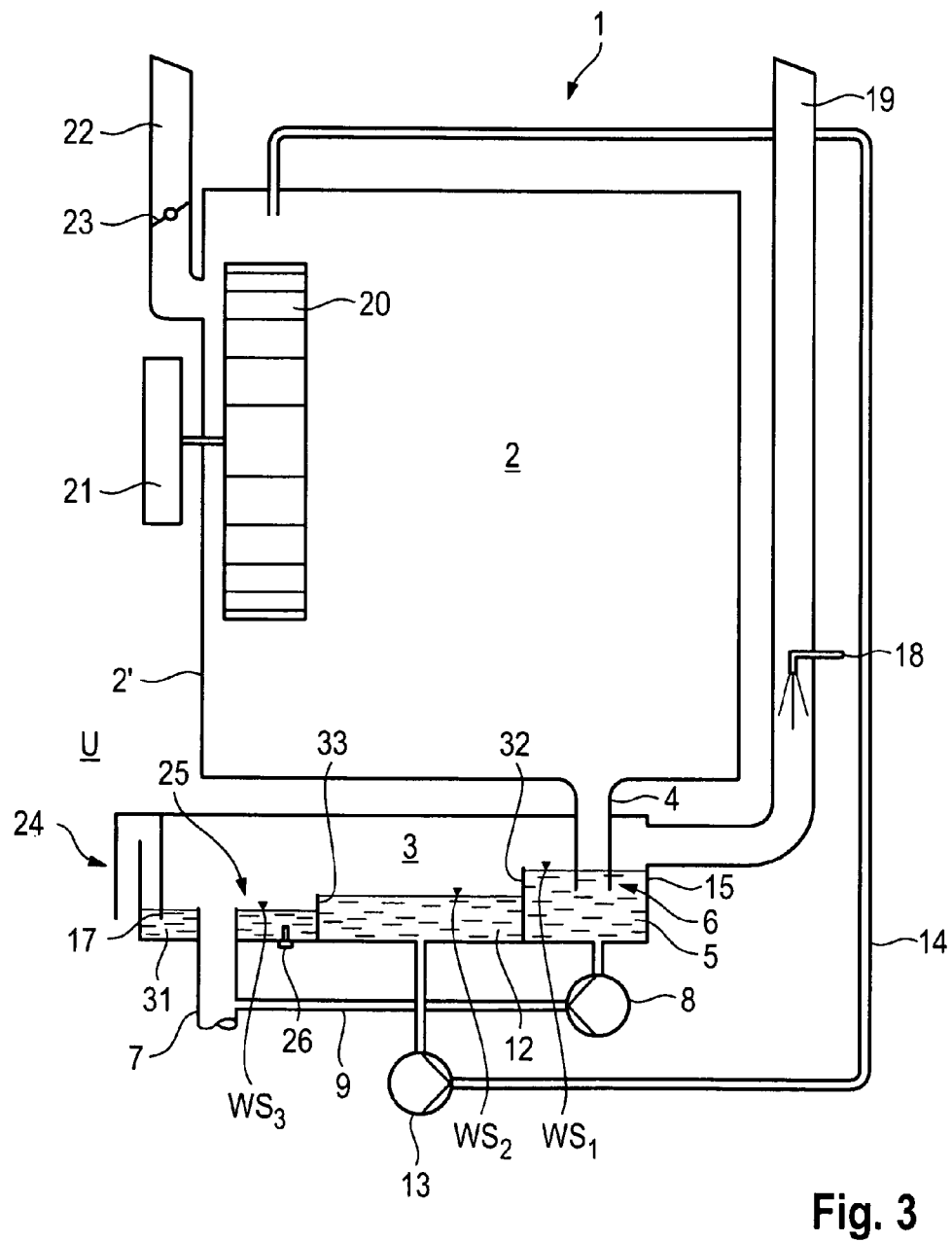
FIG. 3 a depiction of the disclosure corresponding to the depiction of FIG. 1 showing a third embodiment.

FIG. 3 discloses a third embodiment of the cooking device 1 that differs from the embodiment of FIG. 1 only in that there is no connecting conduit 11. So, there is only the second interior chamber 3 in the second container 15 whilst all other components and the respective functions correspond to the first embodiment according to FIG. 1 so that reference can be made to the description of FIG. 1. Consequently, the reference signs corresponding to same of FIG. 1 are identical with the embodiment of FIG. 3.

Figure 4:
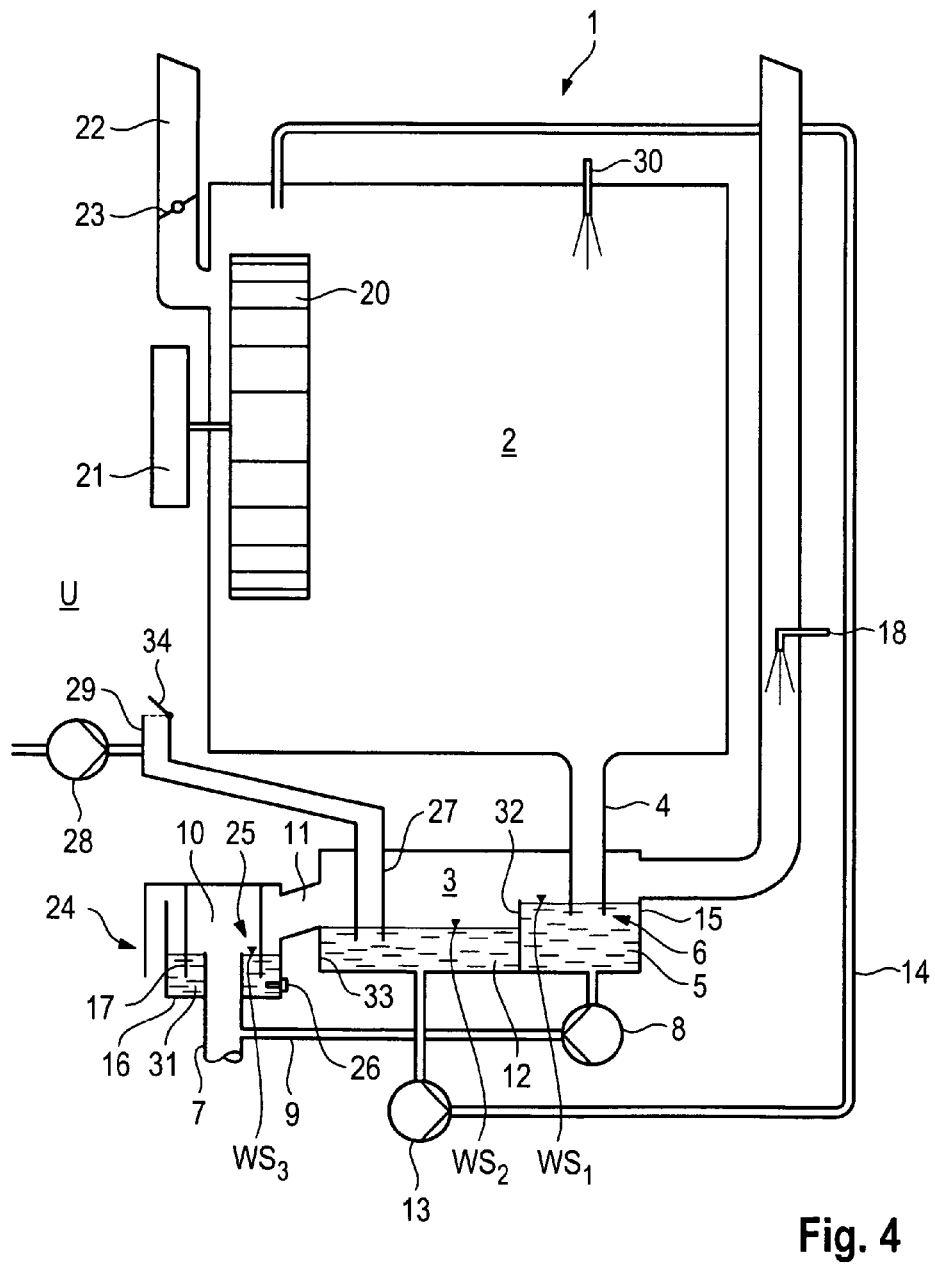
FIG. 4 a depiction corresponding to FIG. 1 showing fourth embodiment.

The fourth embodiment of FIG. 4 corresponds to the embodiment of FIG. 1 but, moreover, comprises a dip tube 27 being equipped with a dosing or metering pump 28. Moreover, the dip tube 27 can be provided with an additional filling tube 29. The remaining components correspond to the embodiment of FIG. 1 so that, again, a reference can be made to the respective description thereof.

With this embodiment, for the purpose of cleaning the first interior chamber 2, the dosing pump 28, the dip tube 27 and the filling tube 29 as well as a nozzle (sprinkler nozzle) 30 can be used. A liquid or solid cleansing agent can automatically be supplied to the second water reservoir 12 by means of the dosing pump 28. Alternatively, the cleansing agent can manually be fed to the second water reservoir 12 by filling it into filling tube 29 that can be opened or closed by means of a movable cover 34.

Figure 5:
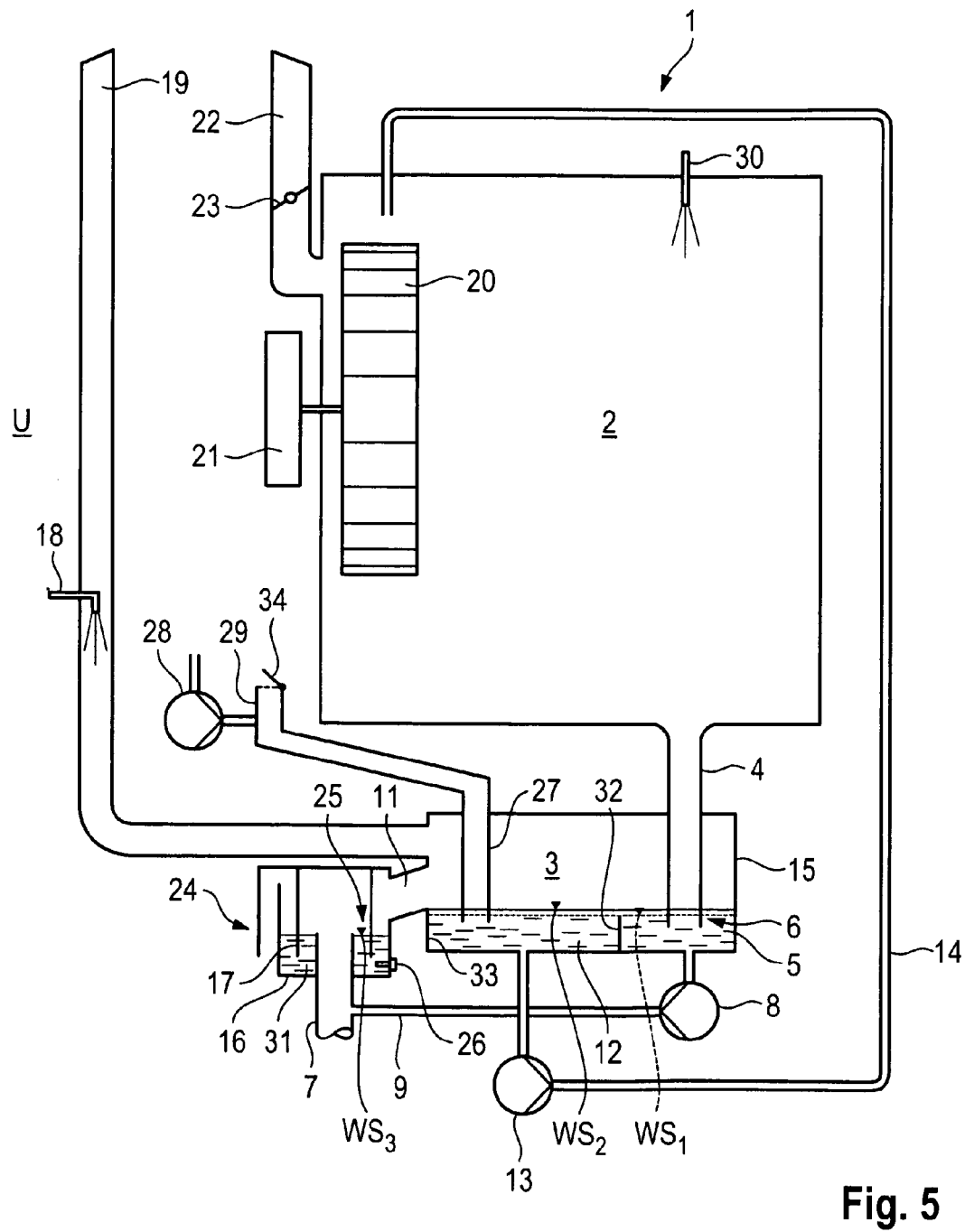
FIG. 5 a depiction corresponding to FIG. 1 showing a fifth embodiment of the present disclosure.

The fifth embodiment of FIG. 5 corresponds to the fourth embodiment with the exception that wall 32 is lower than wall 33 of container 15 of the second interior chamber 3. Consequently, the interior chamber 3 is filled with the water level $WS_2$ as has been indicated by the respective solid line $WS_2$. If pump 8 is activated the water level in chamber 3 is lowered from water level $WS_2$ to water level $WS_1$ that has been represented in FIG. 5 with the dashed line. If, thereafter, pump 8 is still supplying water out of the first water reservoir 5 the water level $WS_1$ in this first reservoir 5 can be lowered further whilst the water reservoir 12 in chamber 3 remains at water level $WS_1$. As another difference it is to be noted that the fresh water inlet 18 is incorporated in the air vent 19 so that e.g. a solid or liquid cleansing agent can also be filled into said air vent 19 and can be flushed into chamber 3 by means of said fresh water inlet 18.

Moreover, the cleaning of the first chamber 2 can be performed in a first step by introducing only clear water into said first chamber 2, and, thereafter, by adding a cleansing agent and by multiply circulating said water/cleansing agent mixture.

All other components and functions correspond to the embodiment of FIG. 4 so that reference can be made to the description of FIG. 4.

In addition to the written disclosure of the disclosure reference is explicitly made to the disclosure of the disclosure according to the depictions of FIGS. 1 to 5.

LIST OF REFERENCE SIGNS 1 cooking device
2 first interior chamber (cooking chamber)
2' housing
3 second interior chamber
4 drain of first chamber 2
5 first water reservoir
6 air trap
7 drain of cooking device 1
8 drain pump
9 conduit
10 third interior chamber
11 connecting conduit
12 second water reservoir
13 recirculating pump [for feeding cleansing water to chamber 2]
14 recirculating line [for feeding cleansing water to chamber 2]
15 container
16 container
17 air trap
18 fresh water inlet
19 air vent
20 fan
21 motor of fan 20
22 fresh air inlet
23 dehumidification valve
24 emergency overflow
25 air trap (odor trap)
26 temperature sensor
27 dip tube
28 dosing (metering) pump
29 filling tube
30 nozzle (sprinkler nozzle)
31 third water reservoir
33, 33 walls cover/lid
34 $WS_1$ first water level
$WS_2$ second water level
$WS_3$ third water level
U Environment

What is claimed is:
1. A cooking device comprising:
a first interior chamber that comprises a cooking chamber;
a second interior chamber containing a first water reservoir having a first water level, wherein the second interior chamber is fluidly connected with the first interior chamber via a drain having an end disposed in communication with the first interior chamber and an end disposed below the first water level to form a first air trap to the environment;
a second water reservoir adjacent to the first water reservoir in the second interior chamber, wherein the second water reservoir has a second water level, and wherein the second water reservoir is separated from the first water reservoir by a wall therebetween; and
a third reservoir having at least a second air trap,
wherein the first air trap is adapted to be opened by lowering the first water level below the end of the drain disposed in communication with the second interior chamber and closed by raising the first water level above the end of the drain disposed in communication second interior chamber, and wherein the second air trap is always closed.

2. The cooking device according to claim 1, further comprising a drain pump fluidly connected with the first water reservoir.

3. The cooking device according to claim 2, wherein the drain pump is fluidly connected with a conduit leading directly or indirectly to a device outlet.

4. The cooking device according to claim 1, wherein the second interior chamber is fluidly connected with a third interior chamber via a connecting conduit, and wherein the third reservoir is disposed in the third interior chamber.

5. The cooking device according to claim 1, wherein the first water level and the second water level have different or the same levels.

6. The cooking device according to claim 1, wherein the second reservoir is fluidly connected with a circulating pump disposed in a recirculating conduit leading to the first interior chamber.

7. The cooking device according to claim 1, further comprising a fresh water supply inlet fluidly connected to the second interior chamber.

8. The cooking device according to claim 4, wherein the second interior chamber comprises an associated container and the third interior chamber comprises a separate associated container, and wherein the associated containers are fluidly connected to each other by a connecting conduit.

9. The cooking device according to claim 8, wherein the associated container of the second interior chamber is made from sheet metal.

10. The cooking device according to claim 8, wherein the associated container of the third interior chamber is made from plastic.

11. The cooking device according to claim 1, wherein the second air trap comprises an air trap to the environment.

12. The cooking device according to claim 1, further comprising a dosing pump fluidly connected with the second chamber via a dip tube.

13. The cooking device according to claim 12, further comprising a filling tube fluidly connected with the dip tube.

14. The cooking device according to claim 3, further comprising a temperature sensor disposed adjacent to the device outlet.

15. The cooking device according to claim 1, wherein the first water reservoir and the second water reservoir are disposed in a single container.

* * * * *